United States Patent Office 3,508,261
Patented Apr. 21, 1970

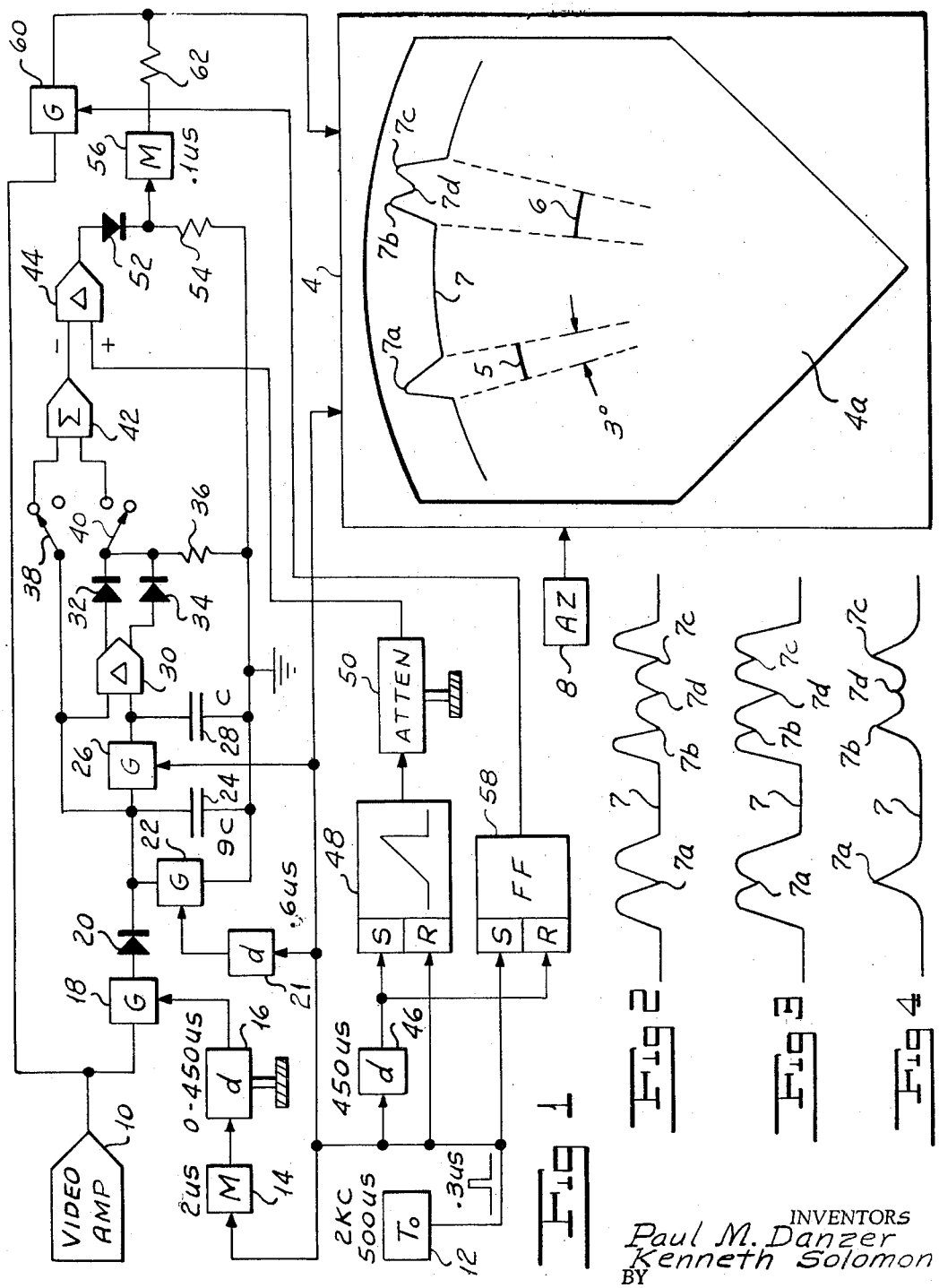

3,508,261
PPI DISPLAY SYSTEM INCLUDING AN AUXILIARY AMPLITUDE VERSUS AZIMUTH DISPLAY
Paul M. Danzer, Norwalk, and Kenneth Solomon, Trumbull, Conn., assignors to United Aircraft Corporation, East Hartford, Conn., a corporation of Delaware
Filed Apr. 22, 1968, Ser. No. 722,940
Int. Cl. G01s 7/10, 7/12
U.S. Cl. 343—11                                    12 Claims

ABSTRACT OF THE DISCLOSURE

This invention samples a radar return signal and displays an auxiliary amplitude versus azimuth display on the outer margin of a conventional display tube which also displays a PPI of the radar return signal. The auxiliary display enables the accurate determination of the azimuthal center of a target.

SUMMARY OF THE INVENTION

Increased azimuth resolution in radar systems is obtained by providing an auxiliary amplitude versus azimuth display from which the azimuthal position of the target center is readily established.

BACKGROUND OF THE INVENTION

The azimuthal position of targets on, for example, a plan position display is obscured because of radar beam width and because of amplitude compression by the display tube phosphor in converting electron beam intensity into light. Radar targets are thus presented as circumferentially extending lines which subtend azimuth angles appreciably exceeding, for example, 2°.

SUMMARY OF THE INVENTION

One object of our invention is to provide on a display tube an auxiliary plot of amplitude of radar return versus azimuth angle so that the azimuthal center of a target may be accurately determined.

Another object of our invention is to provide the auxiliary amplitude-azimuth plot at the outer margin of the display tube so that the azimuthal center of a target may be established with the greatest accuracy.

Other and further objects of our invention will appear from the following description.

DESCRIPTION OF OUR DRAWINGS

In the accompanying drawings which form part of the instant specification and which are to be read in conjunction therewith and in which like reference numerals are used to indicate like parts in the various views:
FIGURE 1 is a schematic view illustrating a preferred embodiment of our invention.
FIGU2E 2 is a graph showing the peripheral display with switches 38 and 40 in their alternate positions.
FIGURE 3 is a graph showing the peripheral display with switch 40 in its alternate position.
FIGURE 4 is a graph showing a peripheral display alternate to that shown in FIGURE 3.

DESCRIPTION OF THE PREFERRED EMBODIMENT

Referring now more particularly to FIGURE 1 of the drawings, the radar system is provided with a video amplifier 10, the output of which is coupled through a gate 60 to the intensity input of a display tube 4 which is provided with a display area 4a. The radar system includes a free-runing multivibrator 12 which provides trigger pulse of .3 microsecond duration at a 2 kc. rate with a corresponding pulse spacing of 500 μs. As will be appreciated by those skilled in the art, the output of multivibrator 12 drives a magnetron, energy from which is radiated by means of an antenna having a relatively small azimuthal beam width of, for example, 2°. The output of multivibrator 12 is also applied to the radial sweep initiating circuit of the display tube 4. The radar antenna is scanned in azimuth and synchronously drives a transducer 8, the output of which actuates the circuits of tube 4 which control the direction along which the radial sweep occurs.

The output of free-running multivibrator 12 is coupled to a monostable multivibrator 14 which provides output pulses of 2 μs. duration. The output of multivibrator 14 is applied to a delay network 16 which may be manually adjusted to provide any time delay between zero and 450 μs. The output of video amplifier 10 is coupled through a gate 18 to the anode of a diode 20. The cathode of diode 20 is coupled to ground through a gate 22 and also through a capacitor 24. Elements 20, 22, and 24 comprise a boxcar or holding circuit. The cathode of diode 20 is coupled through a gate 26 to one plate of a capacitor 28, the other plate of which is grounded. Capacitor 24 should have a capacitance value which is large compared with that of capacitor 28. We have shown the ratio of capacitances to be nine for purposes of illustration. The ungrounded plates of capacitors 24 and 28 are coupled to the two inputs of a differential amplifier 30 which provides push-pull direct-current outputs. The outputs of differential amplifier 30 are connected to the anodes of respective diodes 32 and 34, the cathodes of which are grounded through a resistor 36. The cathode of diode 20 is connected to the armature of a switch 38; and the cathodes of diodes 32 and 34 are connected to the armature of a switch 40. Switches 38 and 40 are connected to the two inputs of a summing amplifier 42, the direct-current output of which is applied to the negative input of a differential amplifier 44. The output of delay network 16 actuates gate 18. Multivibrator 12 actuates gate 26 and is applied through a .6 μs. delay network 21 to actuate gate 22.

The output of multivibrator 12 is coupled through a 450 μs. delay network 46 to the starting input of a sawtooth generator 48. The output of delay network 46 is applied to the re-setting input of a bistable flip-flop 58. Multivibrator 12 is further applied to the re-trace input of sawtooth generator 48 and to the setting input of flip-flop 58. The output of sawtooth generator 48 is coupled through a manually adjustable attenuator 50 to the positive input of differential amplifier 44. The output of differential amplifier 44 is connected to the anode of a diode 52. The cathode of diode 52 is grounded through a resistor 54 and is further applied to the input of a monostable multivibrator 56 which provides output pulses .1 μs. duration. The output of multivibrator 56 is coupled through a resistor 62 to the intensity input of display tube 4. The output of flip-flop 58 actuates gate 60.

In operation of our invention, with switches 38 and 40 in the positions shown, each pulse from multivibrator 12 sets flip-flop 58, which enables gate 60 to pass radar return from video amplifier 10 to the intensity input of tube 4. Each pulse from multivibrator 12 also triggers the sweep circuit of tube 4 so that target pulses are displayed on screen 4a at the proper range. Azimuth control 8 insures that the radial sweep on screen 4a occurs in a direction corresponding to that of the radar antenna.

At 450 μs. after each transmitted pulse, that is, 50 μs. prior to the subsequent transmitted pulse, flip-flop 58 is re-set by delay network 46, thus disabling gate 60 and preventing the display of further target return. It will be noted that upon the screen 4a there appears to the left a distant target 5 at a range corresponding to 400 μs.

and to the right a closer target 6 at a range corresponding to 350 μs. At the periphery of screen 4a is a target amplitude versus azimuth display 7, the base line of which is at a range corresponding to 450 μs.

In order to determine the azimuthal center of target 5, the operator adjusts network 16 to provide a time delay of approximately 399 μs. Each pulse from free-running multivibrator 12 enables gate 22 through network 21, thereby discharging capacitor 24 to ground potential in preparation for subsequently storing the amplitude of target return. Gate 18 is enabled between 399 μs. and 401 μs., and will thus pass radar return corresponding to target 5. Accordingly, there will be stored in capacitor 24 a signal which is proportional to the amplitude of return from target 5. This signal is coupled through switch 38 to summing amplifier 42, which may conveniently provide a equal output signal.

At 450 μs. after each transmitted pulse, sawtooth generator 48 is triggered to provide a ramp output. When the corresponding ramp voltage output of attenuator 50 becomes equal to that stored in capacitor 24, differential amplifier 44 provides a positive output which triggers multivibrator 56. This excites the intensity input of tube 4 at a time subsequent to 450 μs. which is proportional to the amplitude of the target return. When the antenna is directed either to the left or to the right of target 5 by more than 1.5°, the amplitude of the signal output from video amplifier 10 during the actuation of gate 18 is negligible, so that no voltage is stored in capacitor 24. Thus the ramp output voltage of attenuator 50 becomes more positive than that of capacitor 24 immediately upon its triggering by delay network 46 at 450 μs. Accordingly, the output of differential amplifier 44 becomes positive, causing multivibrator 56 to provide a pulse 450 μs. after each transmitted pulse. This creates the base line at a range corresponding ot 450 μs. for the peripheral display 7.

When the beam is centered on the target, the amplitude of radar return during the actuation of gate 18 is maximum; and an appreciable voltage is stored in capacito 24. The ramp output of attenuator 50 thus becomes more positive than the voltage stored in capacitor 24 an appreciable time subsequent to 450 μs. Hence differential amplifier 44 provides a positive output which triggers multivibrator 56 at a later time during the radial sweep. There is thus formed at the periphery of screen 4a a sharply defined waveform 7a in the nature of a pulse, the peak amplitude of which occurs when the center of the transmitted beam is azimuthally aligned with target 5.

In order to isolate the target 6, the operator manually adjusts delay network 16 to 349 μs., so that gate 18 will be enabled between 349 and 351 μs. to pass radar return from target 6. The operator may find that the peripheral display comprises two adjacent and overlapping waveform pulses 7b and 7c closely spaced in azimuth. This will occur when there are two targets at the same range but at slightly differing azimuth angles. It will be noted that the resolution of a conventional display is insufficient to establish that the target pulse 6 is in actuality caused by two different targets.

The amplitude of the pulse-shaped waveform of the peripheral display may be governed by adjustment of attenuator 50. An increase in attenuation increases the amplitude of waveforms 7a, 7b, and 7c, since the output of attenuator 50 will exceed the target amplitude signal stored in capacitor 24 at a later time subsequent to 450 μs. Similarly, decreasing the attenuation provided by attenuator 50 will decrease the amplitudes of waveforms 7a, 7b, and 7c, since the output of attenuator 50 will exceed the target amplitude signal stored in capacitor 24 at a prior time subsequent to 450 μs.

By opening switch 38 and closing switch 40, the azimuthal center of a target is more precisely determined by the sharp null 7a at the midpoint of a waveform which resembles two adjacent rectified half cycles of a sinusoid, as may be seen by reference to FIGURE 2. At time zero, a pulse from multivibrator 12 actuates gate 26 transferring the voltage of capacitor 24 to capacitor 28. After a delay of .6 μs provided by network 21, gate 22 is actuated, thereby discharging capacitor 24 to ground potential in preparation for subsequently storing the amplitude of target return. Upon the actuation of gate 18, target return is coupled through diode 20 charging capacitor 24. Differential amplifier 30 now provides an output voltage proportional to the change which has occurred in the amplitude of target return between successive pulses, occasioned by azimuthal motion of the antenna. The circuit thus acts in a manner analogous to a differentiator. From the time the leading edge of the beam first picks up the target until the center of the beam is on the target, the amplitude of target return is increasing; and the voltages stored in capacitor 24 will always exceed those transferred to capacitor 28. When the center of the beam is passing through the target during the course if its azimuthal motion, the voltages stored in capacitor 24 will be substantially equal to those transferred to capacitor 28, so that the outputs of differential amplifier 30 will both be at ground potential. From the time the center of the beam passes the target until the trailing edge of the beam leaves the target, the amplitude of radar returning is decreasing; and the voltages stored in capacitor 24 will always be less than those transferred to capacitor 28. Each output of differential amplifier 30 is an S-shaped waveform resembling a full cycle of a sinusoid. Diodes 32 and 34 in conjunction with resistor 36 constitute a full-wave rectifier, so that the output at switch 40 which is now coupled to summing amplifier 42 comprises two adjacent half cycles of the same polarity. The sharp null between the two adjacent positive-going half cycles defines the azimuth angle at which the radar return is maximum and hence its derivative is zero. A replica of this waveform will appear as the peripheral display 7 on screen 4a. If two closely spaced targets are present, then the peripheral display 7 will comprise four adjacent positive-going half cycles, wherein the null 7b between the first and second half cycles identifies the azimuthal center of one target and wherein the null 7c between the third and fourth half cycles identifies the azimuthal center of the other target. The first and fourth half cycles are of larger amplitude than the second and third half cycles. A null occurs between the second and third half cycles which, however, does not correspond to any target. This extraneous null corresponds to the minimum 7d in FIGURE 1 which lies between the peaks 7a and 7c.

By closing both switches 38 and 40, the peripheral display 7 will be as shown in FIGURE 3, wherein the sum of amplitude and rate-of-change of amplitude are simultaneously employed. The azimuthal center 7a of a single target is sharply defined. The azimuthal centers 7b and 7c of a pair of closely spaced targets are now well defined and easily distinguishable from the minimum 7d. In the display of FIGURE 3, the negative input of differential amplifier 44 comprises target amplitude augmented by its rate-of-change.

The display of FIGURE 4 may be obtained by reversing the polarity of diodes 32 and 34 in order to generate negative-going half cycles for summing amplifier 42. Alternatively, amplifier 42 may comprise a differential amplifier; and switch 40 should be applied to the negative input thereof. It will be noted that target centers 7a, 7b, and 7c appear as very sharp peaks which are readily distinguishable from the minimum 7d. In the display of FIGURE 4, the negative input of differential amplifier 44 comprises target amplitude diminished by its rate-of-change.

It will be seen that we have accomplished the objects of our invention. We have provided an auxiliary display of amplitude of radar return versus azimuth angle, so that the azimuthal center of the target may be accurately determined. By providing an auxiliary trace which includes rate-of-change of amplitude versus azimuth angle, azimuthal target center may be determined with high precision. The auxiliary trace is provided at the outer margin of the display tube, so that azimuthal accuracy is retained even for very close targets for which azimuthal accuracy has always been poor because of the short radius vector.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific deails shown and described.

Having thus described our invention, what we claim is:

1. A display system including in combination a video signal source, means for generating a ramp function, means for periodically providing pulses, means operable at a fixed time after each pulse for actuating the ramp function generating means, said fixed time being a major portion of the period between pulses, means responsive to said source for sampling the video signal at a predetermined time after each pulse, said predetermined time being greater than zero but less than said fixed time, and comparing means responsive to the sampling means and to the generating means.

2. A system as in claim 1 which further includes a display device having an intensity input, and means responsive to the comparing means for applying to the intensity input a single signal pulse of a constant and short duration.

3. A system as in claim 1 and in which the sampling means comprises a gate and means for momentarily actuating the gate at said predetermined time after each pulse.

4. A system as in claim 1 which further includes a display device, means including a gate for coupling the source to the device, and means operable at said fixed time after each pulse for disabling the gate.

5. A system as in claim 1 wherein the sampling means comprises a rectifier serially coupled to a capacitor and a discharging gate shunting the capacitor.

6. A system as in claim 1 wherein the sampling means comprises a first capacitor, a second capacitor, a first gate coupling the first capacitor to the second capacitor, a discharging gate shunting the first capacitor, means for momentarily actuating the first gate in approximate concurrence with each pulse, means for momentarily actuating the discharging gate slightly subsequent to each actuation of the first gate, means differentially responsive to the first and second capacitors for provinding a first output, and full-wave rectifying means responsive to the first output for providing a second output.

7. A system as in claim 1 wherein the sampling means comprises means for providing an output proportional to the amplitude of the video signal.

8. A system as in claim 1 wherein the sampling means comprises means for providing an output proportional to the absolute value of the change in amplitude of the video signal between successive samplings.

9. A system as in claim 1 wherein the sampling means comprises means for providing an output proportional to the amplitude of the video signal augmented by the absolute value of its change in amplitude between successive samplings.

10. A system as in claim 1 wherein the sampling means comprises means for providing an output proportional to the amplitude of the video signal diminished by the absolute value of its change in amplitude between successive samplings.

11. A display system as in claim 1 wherein the sampling means comprises a capacitor, means including a first gate and a rectifier for coupling the source to the capacitor, a discharging gate shunting the capacitor, means for momentarily actuating the first gate at said predetermined time after each pulse, and means for momentarily actuating the discharging gate in approximate concurrence with each pulse.

12. A display system as in claim 1 wherein the video signal source comprises a radar receiver, the system further including means for adjusting said predetermined time in accordance with the range of a selected radar target.

References Cited

UNITED STATES PATENTS

| | | | |
|---|---|---|---|
| 3,093,822 | 6/1963 | Balding | 343—11 |
| 3,108,224 | 10/1963 | Bradsell | 343—11 X |
| 3,287,726 | 11/1966 | Atlas | 343—11 X |
| 3,368,218 | 2/1968 | Fenn et al. | 343—6 |

RODNEY D. BENNETT, Jr., Primary Examiner

M. F. HUBLER, Assistant Examiner

U.S. Cl. X.R.

343—16